United States Patent
Suzuki

(10) Patent No.: US 9,380,285 B2
(45) Date of Patent: Jun. 28, 2016

(54) STEREO IMAGE PROCESSING METHOD, STEREO IMAGE PROCESSING DEVICE AND DISPLAY DEVICE

(75) Inventor: Kenji Suzuki, Yokohama (JP)

(73) Assignee: SAMSUNG DISPLAY CO., LTD., Yongin-Si, Gyeonggi-Do (KR)

(*) Notice: Subject to any disclaimer, the term of this patent is extended or adjusted under 35 U.S.C. 154(b) by 985 days.

(21) Appl. No.: 13/314,631

(22) Filed: Dec. 8, 2011

(65) Prior Publication Data

US 2012/0154388 A1 Jun. 21, 2012

(30) Foreign Application Priority Data

Dec. 20, 2010 (JP) .................................. 2010-283014
Nov. 2, 2011 (KR) ........................ 10-2011-0113460

(51) Int. Cl.
| | |
|---|---|
| *G06T 15/00* | (2011.01) |
| *G06K 9/00* | (2006.01) |
| *H04N 1/40* | (2006.01) |
| *H04N 7/12* | (2006.01) |
| *H04N 9/09* | (2006.01) |
| *H04N 13/00* | (2006.01) |
| *H04N 13/02* | (2006.01) |

(52) U.S. Cl.
CPC ........ *H04N 13/0007* (2013.01); *H04N 13/0246* (2013.01)

(58) Field of Classification Search
CPC ............ G06T 15/00; H04N 7/12; H04N 9/09; H04N 13/00; G06K 9/00; A61B 1/04
USPC ................ 345/419; 348/42, 45, 262, E5.066, 348/E5.081, E7.013, E13.015, E13.016; 375/240.16; 382/154, 103; 600/111; 358/471, 483
See application file for complete search history.

(56) References Cited

U.S. PATENT DOCUMENTS

| | | | | |
|---|---|---|---|---|
| 4,875,099 A | * | 10/1989 | Sakai ................... | H04N 1/1903 358/471 |
| 5,860,912 A | * | 1/1999 | Chiba ................ | A61B 1/00059 348/45 |

(Continued)

FOREIGN PATENT DOCUMENTS

| | | | | |
|---|---|---|---|---|
| CN | 1678035 | 10/2005 | | |
| CN | 101325724 | 12/2008 | | |
| JP | 2001045523 | 2/2001 | | |
| JP | 2001-082955 | 9/2001 | | |
| JP | 2001-267431 | 9/2001 | | |
| JP | 2002157576 | 5/2002 | | |
| JP | 2007-200364 | 8/2007 | | |
| JP | 2008175635 | 7/2008 | | |
| JP | 2008175635 A | * | 7/2008 | ............. G01B 11/00 |
| JP | 2010-128575 | 6/2010 | | |
| KR | 100263936 B1 | * | 8/2000 | ............. H04N 13/00 |
| KR | 1020050051554 | 6/2005 | | |

*Primary Examiner* — Geepy Pe
*Assistant Examiner* — Syed Hasan
(74) *Attorney, Agent, or Firm* — F. Chau & Associates, LLC

(57) ABSTRACT

A stereo image device includes a representative point selection unit for selecting a plurality of representative points in a first image of a stereo-pair image; a corresponding point control unit detecting a plurality of corresponding points corresponding to the plurality of representative points in a second image of the stereo-pair image and excluding any corresponding point(s) judged to be a deviating point; a deviation value calculation unit for judging whether corresponding points are the deviating points or not; an approximation curve calculation unit performing a curve approximation on all the corresponding points except the excluded corresponding points; a height correction value calculation unit calculating a height correction value from a plurality of approximation curves drawn up by the curve approximation; a parallelization execution unit performing parallelization of the second image on the basis of the height correction value.

9 Claims, 10 Drawing Sheets

(56) References Cited

U.S. PATENT DOCUMENTS

| | | | |
|---|---|---|---|
| RE39,342 E | 10/2006 | Starks et al. | |
| 7,158,665 B2 * | 1/2007 | Arima | G06T 7/0075 348/E13.015 |
| 7,272,256 B2 | 9/2007 | Zhang et al. | |
| 2003/0190073 A1 | 10/2003 | Arima | |
| 2004/0022320 A1 * | 2/2004 | Kawada | G06T 7/2013 375/240.16 |
| 2005/0213159 A1 * | 9/2005 | Okada | H04N 1/387 358/3.26 |
| 2008/0218611 A1 * | 9/2008 | Parulski | H04N 5/2258 348/262 |
| 2008/0247602 A1 | 10/2008 | Fields et al. | |
| 2009/0304232 A1 * | 12/2009 | Tsukizawa | A61B 3/113 382/103 |

* cited by examiner

──■ : Vector at Check Target Point(u,v)

──▶ : Average Vector at Surrounding 8 Points($u_a, v_a$)

STEREO IMAGE PROCESSING METHOD, STEREO IMAGE PROCESSING DEVICE AND DISPLAY DEVICE

CROSS-REFERENCE TO RELATED APPLICATIONS

This U.S. non-provisional patent application claims priority under 35 U.S.C. §119 of Japanese Patent Application No. 2010-0283014, filed on Dec. 20, 2010 and of Korean Patent Application No. 10-2011-0113460, filed on Nov. 2, 2011, the entire contents of which are hereby incorporated by reference.

TECHNICAL FIELD

The present inventive concept herein relates to a stereo image processing method, a stereo image processing device and a display device.

DISCUSSION OF THE RELATED ART

Recently, equipment displaying stereo images such as 3D TV, etc. have become popular consumer electronic devices. Before displaying a 3D image produced from a stereo image for two eyes, (i.e., a stereo-pair image), a method of extracting depth information from the stereo-pair image and using the extracted depth information is used. A stereo-pair image contains two views of a scene side by side. One of the views is intended for the left eye and the other for the right eye.

FIG. 1 is a drawing of a simulated stereo-pair image annotated for illustrating a method of extracting depth information from a stereo-pair image by a stereo matching.

To extract depth information, in a stereo-pair image, as illustrated by (I), a corresponding point (stereo matching) is searched for between a left image (L) and a right image (R). Depth information is extracted from the left image (L) to express its depth using the stereo matching. As illustrated by (II), the left image (L) and the depth information D are preserved as information and a 3D display is performed using that information.

In the event that a stereo matching is performed, a corresponding point may be effectively searched when heights (a location of vertical direction) of object of left and right images are adjusted to each other. However, in the event of taking a picture with a stereo camera, there are many cases that horizontality of left and right cameras does not coincide. As illustrated in FIG. 2, in the event that a right camera is inclined toward a left camera and horizontality of the left and right cameras does not coincide with each other, since heights of objects of left and right images are not adjusted to each other, a corresponding point is not exactly searched.

Taking a picture with a stereo camera is done using a parallel method and a crossover method. When taking a picture using a crossover method, due to a characteristic of photography itself, as illustrated in FIG. 3, trapezoid distortion occurs in an image that is taken (keystone effect). In this case, a height of object is not adjusted.

In the event that there is a difference of height of the left and right cameras in an inputted stereo-pair image, if a stereo matching is performed as it is and depth information about a two-dimensional image is prepared, a corresponding point cannot be accurately searched.

Thus, when searching a corresponding point on an image taken by a stereo camera, heights of objects in the left and right images need to be adjusted by any preprocessing.

Conventionally, various methods have been used to adjust heights of objects in the left and right images. The method that is typically used is a parallelization by an Epipolar geometry. Among the various methods, a method is general which performs a calibration (i.e., parallelization to achieve parallelism of the first image and the second image) using a publicly known pattern in advance before taking a picture. However, since it is necessary to perform a parallelization using a publicly known pattern on a stereo image and a photographer, when expressing 3D display in a display device, it cannot be applied to a stereo image that has been already taken.

Another method to achieve parallelism is by an Epipolar geometry, and there is a method of performing a self calibration (refer to Japan Publication No. 2007-200364). The method is not performing parallelization using a publicly known pattern in advance but performing parallelization using distinguishing patterns in an image having a straight line such as a building, a road line, etc. However, in this method, there is a problem that a linear edge is needed in the scene of an image and there is also a problem that an error of photographing the line can be great and a parallelization not accurately performed.

There is another method to perform a parallelization based on the premise that a direction of a scanning line of the image coincides with an Epipolar line, on the basis of correlation of left and right images, a row corresponding to a row of the left image is searched for in the right image, thereby adjusting heights of the left and right images.

SUMMARY

An aspect of the inventive concept provides a stereo image device. The stereo image device may include an image input unit receiving a stereo-pair image; a representative point selection unit selecting a plurality of representative points in a first image of the stereo-pair image; a corresponding point control unit detecting a plurality of corresponding points corresponding to the plurality of representative points in a second image of the stereo-pair image and excluding the corresponding points judged to be deviating points; a deviation value calculation unit judging whether the corresponding points are deviating points or not; an approximation curve calculation unit performing a curve approximation on all the corresponding points except the excluded deviating points; a height correction value calculation unit interpolating a height correction value for each pixel of the second image from a plurality of approximation curves drawn up by the curve approximation; a parallelization execution unit performing parallelization of the second image on the basis of the height correction values; and an image output unit outputting the first image and the second image on which parallelization is performed.

Embodiments of the inventive concept also provide a method of processing a stereo image. The method may include inputting a stereo-pair image; selecting a plurality of representative points in a first image of the stereo-pair image; detecting a plurality of corresponding points corresponding to the plurality of representative points in a second image of the stereo-pair image; judging whether each of the corresponding points is a deviating point or not and excluding the corresponding points judged to be deviating points; performing a curve approximation on the corresponding points other than the deviating points; interpolating the height correction values of the pixels of the second image from a plurality of approximation curves drawn by the curve approximation; performing parallelization of the second image on the basis of the height correction values; and outputting the first image and the second image on which parallelization is performed.

Embodiments of the inventive concept also provide a display device. The display device may include a display panel; an image signal input unit receiving an image signal including a stereo-pair image comprised of a first image and a second image; a stereo image processing device executing a height correction of the second image of the stereo-pair image and generating a height-corrected (parallelized) second image of the stereo-pair image; a stereo matching unit executing a stereo matching of the height-corrected stereo-pair image and generating depth information of the first image; a time difference image composing unit drawing up a time difference image using the first image and the depth information; and a timing control unit generating a clock signal to distribute the time difference image to pixels of the display panel. The stereo image processing device comprises an image input unit receiving a stereo-pair image from the image signal input unit; a representative point selection unit selecting a plurality of representative points in the first image of the stereo-pair image; a corresponding point control unit detecting a plurality of corresponding points corresponding to the plurality of representative points in the second image of the stereo-pair image and excluding each corresponding point judged to be a deviating point; a deviation value calculation unit judging whether or not each corresponding point is a deviating point; an approximation curve calculation unit performing a curve approximation on all the corresponding points except the excluded deviating points; a height correction value calculation unit interpolating a height correction value from a plurality of approximation curves drawn up by the curve approximation; a parallelization execution unit performing parallelization of the second image on the basis of the height correction values; and an image output unit outputting the corrected stereo-pair image including the first image and the second image on which parallelization is performed to the stereo matching unit.

Some selected corresponding points will be deviating points because block matching using a minimum SAD method does not always guarantee the right matching points when the an image characteristic is small such as in low-light conditions of high noise, or with flat scenes such as a blue sky. If the scene was captured at low light conditions, it will have relatively more noise, and thus the detection of representative points may not be accurate in some areas of the images. Even if the scene is not captured in the low light condition, if the scene is too flat, the detection of representative points may not be accurate. If the tile scene is very flat like a cloudy sky or blue sky, there can be some representative points in the first image that will have multiple corresponding point candidates at many places in the second image having the same (SAD) level of matching. Thus, there are cases such as high noise or flat scene videos where the detection of corresponding points may not be reliable.

Embodiments of inventive concepts will be described more fully hereinafter with reference to the accompanying drawings, in which embodiments of the invention are shown.

Preferred embodiments of the inventive concept will be described below in more detail with reference to the accompanying drawings. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of regions may be exaggerated for clarity.

BRIEF DESCRIPTION OF THE FIGURES

The above and other features will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Figure 4:
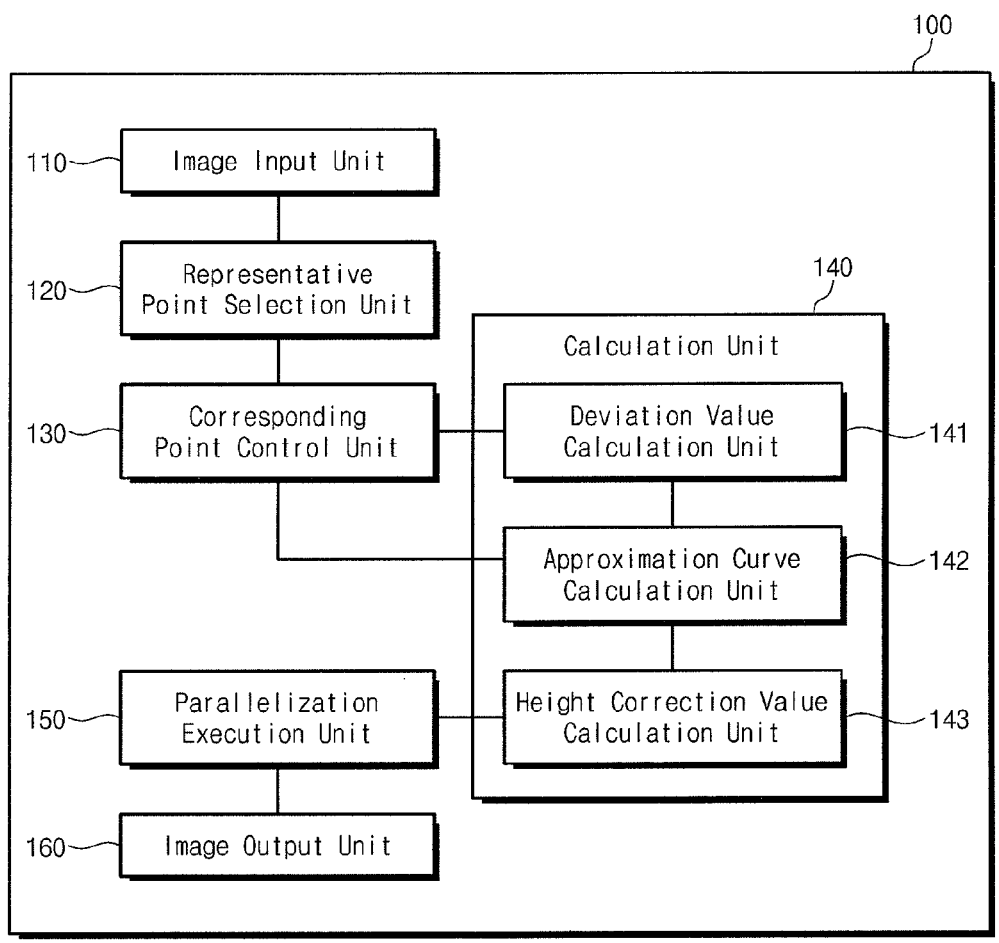
FIG. 4 is a block diagram of a stereo image processing device in accordance with some embodiments of the inventive concept.

FIG. 4 is a block diagram of a stereo image processing device 100 in accordance with some embodiments of the inventive concept.

Referring to FIG. 4, the stereo image processing device 100 includes an image input unit 110, a representative point selection unit 120, a corresponding point control unit 130, a calculation unit 140, a parallelization execution unit 150 and an image output unit 160. Each of the constituent elements may be implemented by a logic circuit such as FPGA or ASIC, or by a processor such as CPU or GPU, ROM, RAM or a system LSI or by combinations thereof.

A stereo-pair image data is received into the image input unit 110. The stereo-pair image includes two images, a first image (e.g., Left image) and a second image (e.g., Right image) that are respectively captured by two imaging devices. For example, between a left image and a right image that are captured by a stereo camera, the left image is called the first image and the right image is called the second image. The first image is a two-dimensional image and the second image is also a two-dimensional image that may be used with the first image to extract depth information by using a stereo matching method.

The representative point selection unit 120 selects a plurality of points in the first image as representative points in the first image. The representative points may be pixels on selected horizontal and vertical lines set on an image and at the crossing points thereof located on multiple lattice points. It is desirable that the number of selected representative points is predetermined according to performance of device selecting the desired number and performing an image processing, and desired accuracy. For example, 400 pixels arranged at regular intervals in a array of 20 columns and 20 rows may be selected to be the representative points.

The corresponding control unit 130, searches in the second image for a corresponding point corresponding to each of the representative points in the first image. A block matching method may be used to search for each of the corresponding points.

Figure 5:
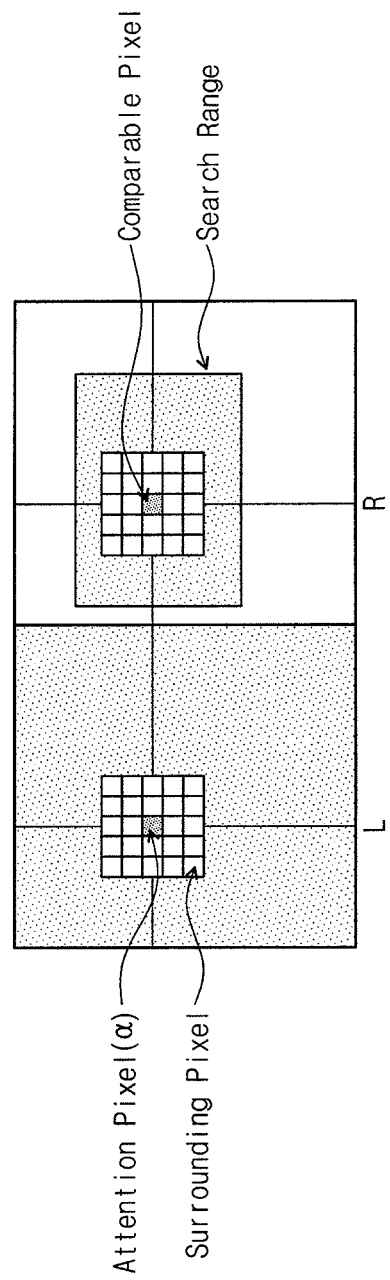
FIG. 5 is a drawing of a simulated stereo-pair image annotated for describing a block matching method of the device of FIG. 4.

FIG. 5 is a drawing of a simulated stereo-pair image annotated for describing a block matching method of the device of FIG. 4 for searching for each of the corresponding points.

A left reference image is called a L image and a right reference image is called a R image. A block matching method, as illustrated in FIG. 5, is to search within a predetermined search range in the R image, for a corresponding pixel ($\alpha'$) having a high correlation with an attention pixel ($\alpha$) of the L image using pixel values of peripheral pixels of attention pixel ($\alpha$) of the L image. In the block matching method, peripheral pixel values surrounding the attention pixel ($\alpha$) and each of comparable pixels within the search range are calculated and the correlation between the attention pixel ($\alpha$) and each of the comparable pixels is obtained from the calculated peripheral pixel values. The correlation is judged using a SAD (sum of absolute difference) or SSD (sum of squared intensity difference). A pixel having the highest correlation with the attention pixel ($\alpha$) is considered as the corresponding pixel ($\alpha'$) with respect to the attention pixel ($\alpha$).

Figure 6:
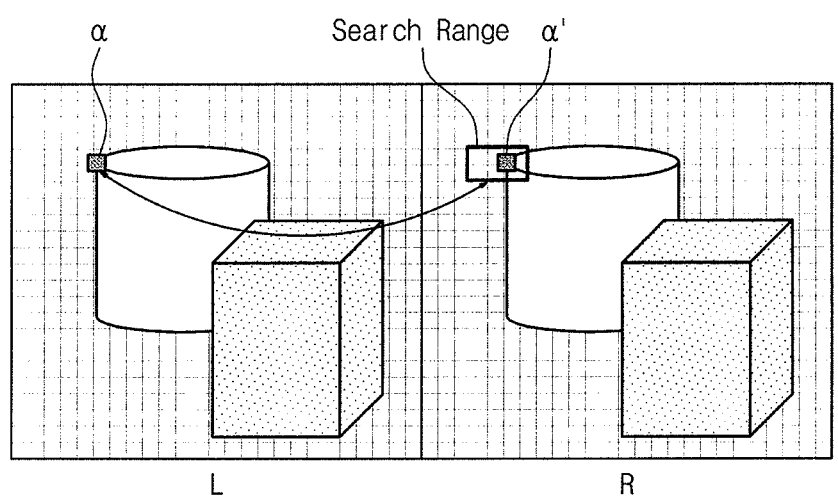
FIG. 6 is a drawing of a simulated stereo-pair image annotated for illustrating an example of applying the block matching method to a corresponding point search.

FIG. 6 is a drawing of a simulated stereo-pair image annotated for illustrating an example of applying the block matching method to a corresponding point search.

In a method of processing a stereo image in accordance with some embodiments of the inventive concept, a pixel in a representative point in the first image is considered as the attention pixel ($\alpha$) and a pixel in the second image, having the highest correlation with the attention pixel ($\alpha$) among the comparable pixels becomes a corresponding point ($\alpha'$).

For example, in FIG. 6, a corresponding point ($\alpha'$) in a right image R, corresponds to a representative point ($\alpha$) in a left image L. Thus the representative point ($\alpha$) in the first (L) image is searched for within a search range bounded by a square in the second image. After searching, a point having the highest correlation with the representative point ($\alpha$) is detected as the corresponding point ($\alpha'$).

A search range is around a coordinate in the second image corresponding to the coordinate of representative point ($\alpha$) in the first image. Even in the case that in the designation of first and second images as left and a right respectively, are reversed, a search of corresponding point is possible by setting a search range in the second image with respect to a coordinate of a representative point ($\alpha$) in the first image. Also, the search range may be set to a range of desired size depending on a time difference.

In this manner, a corresponding point ($\alpha'$) is detected with respect to each representative point ($\alpha$).

The corresponding point control unit 130 excludes a corresponding point calculated as a deviating point by a deviation value calculation unit 141 that will be described later.

The calculation unit 140 includes a deviation value calculation unit 141, an approximation curve calculation unit 142 and a height correction value calculation unit 143.

The deviation value calculation unit 141 judges a corresponding point ($\alpha'$) corresponding to a representative point ($\alpha$) of a part in which an image characteristic is small or a corresponding point representing a different trend from the surrounding corresponding points as a deviating point with respect to a corresponding point detected by the corresponding point control unit 130.

Judgment of a deviating point is performed by performing two steps. In the first step, a corresponding point ($\alpha'$) corresponding to a representative point ($\alpha$) of a part in which an image characteristic is small is considered as a deviating point. Since a wrong corresponding point is more likely to be selected with respect to a corresponding point corresponding to a representative point of part in which an image characteristic is small, a corresponding point corresponding to a relevant part is excluded as a deviating point and is not used in a subsequent process.

More specifically, in a process of detecting a corresponding point ($\alpha'$) corresponding to a representative point ($\alpha$) using the SAD: in the case that the SAD value of a point judged to be a representative point and having the smallest SAD value is called $SAD_{1st}$ and; the SAD value of point having the second smallest SAD value is called $SAD\ 2_{nd}$, if a difference between the $SAD_{1st}$ and the $SAD\ 2_{nd}$ is smaller than a predetermined threshold value $Th_1$, a corresponding point ($\alpha'$) is judged to be a deviating point.

If $SAD\ 2_{nd} - SAD_{1st} < Th_1$, a point is that in which an image characteristic is small and the point is judged to be a deviating point. If $SAD\ 2_{nd} - SAD_{1st} > Th_1$, a point is that in which an image characteristic is large and the point is left as a corresponding point.

In a second step, if the detected corresponding point has a different trend from that represented in surrounding corresponding points, the detected corresponding point is judged to be a deviating point. Thus, a corresponding point that is a target of judgment is judged whether it is a deviating point or not by comparing the target corresponding point with corresponding points around the target corresponding point and by judging whether the target corresponding point has the same trend as the corresponding points around the target corresponding point, (whether the target corresponding point moves in the same direction as corresponding points around the target corresponding point.

Figure 7:
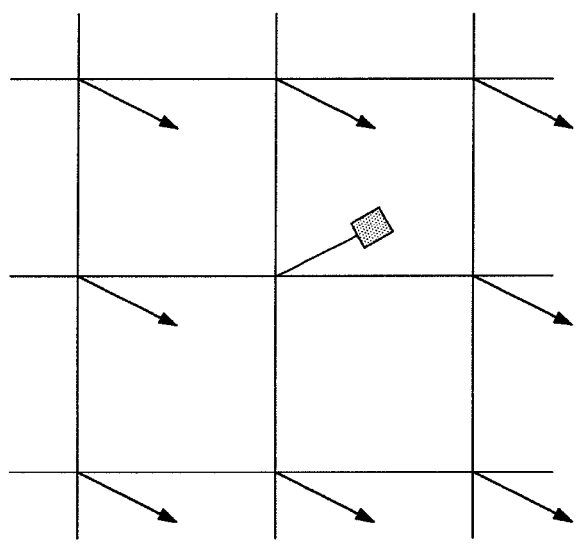
FIG. 7 is a drawing illustrating an example of judgment of deviating point in the device of FIG. 4.

FIG. 7 is a drawing illustrating an example of judging a deviating point in the device of FIG. 4. Deviation of a corresponding point is decided based on whether or not the vector of a detected corresponding point has a different trend from that of corresponding points around the detected corresponding point. In FIG. 7, a target corresponding point is compared with corresponding points corresponding to 8 representative points around the representative point corresponding to the target corresponding point. How much deviation each corresponding point corresponding to 8 representative points around the representative point, has (from the corresponding representative point that is a lattice point) is represented by a vector. An average vector ($u_a, v_a$) is calculated based on the 8 vectors. The average vector value is compared with a deviation vector ($u, v$) from a representative point of target corresponding point and the compared value is judged to be a deviating point if it is higher than a predetermined threshold value ($Th_2$). Other methods of vector comparison are possible and are within the scope of the present invention.

In case of $(u-u_a)^2+(v-v_a)^2>Th_2$, a corresponding point that is a target of judgment represents a different trend from corresponding points around the corresponding point that is a target of judgment and is judged to be a deviating point; and in case of $(u-u_a)^2+(v-v_a)^2<=Th_2$, a corresponding point that is a target of judgment represents the same trend as corresponding points around the corresponding point that is a target of judgment and is left as a corresponding point.

It is sufficient to conduct any one of two steps of deviating point judgment described above but it is preferable to conduct a deviating point judgment of two steps to calculate an approximation curve having a high degree of precision in a subsequent process. Also, it is good to judge a deviating point using a method to except the deviation based on the value judgment described above.

The approximation curve calculation unit 142 performs a curve approximation and calculates an approximation curve on all corresponding points except the corresponding point judged to be a deviating point. As a method of curve approximation, a least square method may be used. A curve approximation is applied by a linear polynomial expression, and thus may include a straight-line approximation. Thus an approximation curve includes an approximation straight line.

Figure 8:
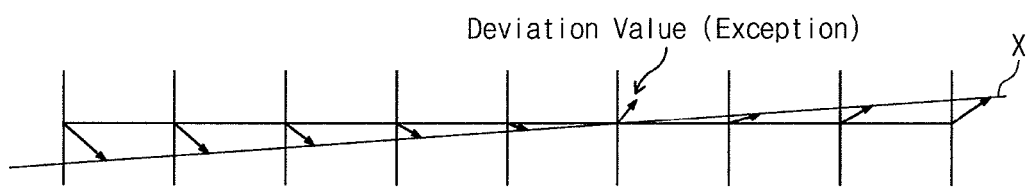
FIG. 8 is a drawing illustrating an example of performing a curve approximation for corresponding points.

FIG. 8 is a drawing illustrating an example of performing a curve approximation for corresponding points and obtaining an approximation curve from which X is calculated. Here, when executing a curve approximation, a calculation is performed to except all the corresponding points judged to be deviating points. In FIG. 8, a straight-line approximation is executed.

In the case of a display device, a calculation precision is improved by performing a curve approximation in a horizontal direction, and it is desirable to perform a curve approximation in a vertical direction.

A plurality of approximation curves calculated in this manner are parallel in a second image by parallelism. In case of performing a curve approximation in the horizontal direction, it may become horizontality by parallelization and may be adjusted to a scanning direction.

The height correction value calculation unit 143 draws up an offset map representing a correction value height direction on the basis of an approximation curve calculated by the approximation curve calculation unit 142.

Figure 9:
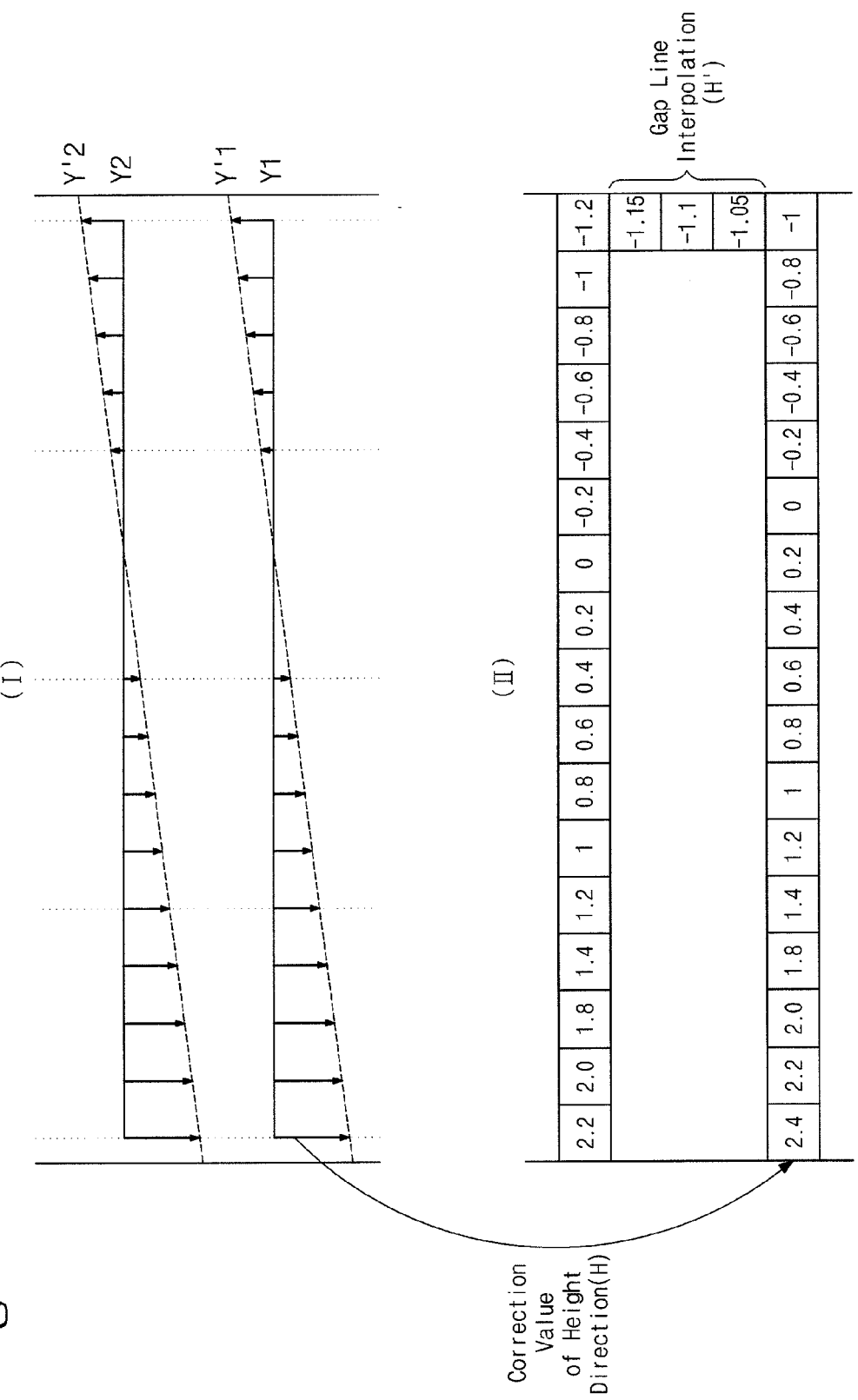
FIG. 9 is a drawing illustrating an example of drawing from an approximation curve an offset map representing a correction value of height direction in the image processing device of FIG. 4.

FIG. 9 is a drawing illustrating an example to draw up from an approximation curve an offset map representing a correction value of height direction in an image processing device in accordance with some embodiments of the inventive concept.

As illustrated by (I), a difference of height between an approximation curve calculated by the approximation curve calculation unit 142 and a straight line formed by connecting a representative point corresponding to a corresponding point used to form the approximation curve is detected.

As illustrated by (II), the detected height difference is preserved by a height direction correction value (H) and an offset map is drawn. Since a height interpolation is performed between a plurality of approximation curves, that is, a gap line, an offset map of correction value (H) of height direction is drawn even between approximation curves (Y'2 and Y'1). Assignment of correction value (H) of height direction between approximation curves (Y'2 and Y'1) is conducted by interpolating values between a correction value of height direction of Y'2 and a correction value of height direction of Y'1.

For example, as illustrated by (II), in the case that a correction value of height direction at some offset of Y'1 is −1 and a correction value of height direction at some offset of Y'2 located at its vertical direction is −1.2, the interpolated correction values of height direction between them is set to −1.05, −1.1 and −1.15.

According to a correction value of height direction calculated in this manner, in the parallelization execution unit 150, a height correction, (i.e., parallelization) is performed on the whole second image. Also, when parallelization is performed, images of the top and the bottom may be missed in an original image. At this time, an original image may be used in a missing place. By doing so, a deviation of height between the first image and the second image may be resolved.

A corrected stereo-pair image is output to a device performing a stereo matching by the image output unit 160. By matching a stereo using the corrected stereo-pair image, a result of good stereo matching may be obtained and a three dimensional image of high quality may be obtained.

Figure 10:
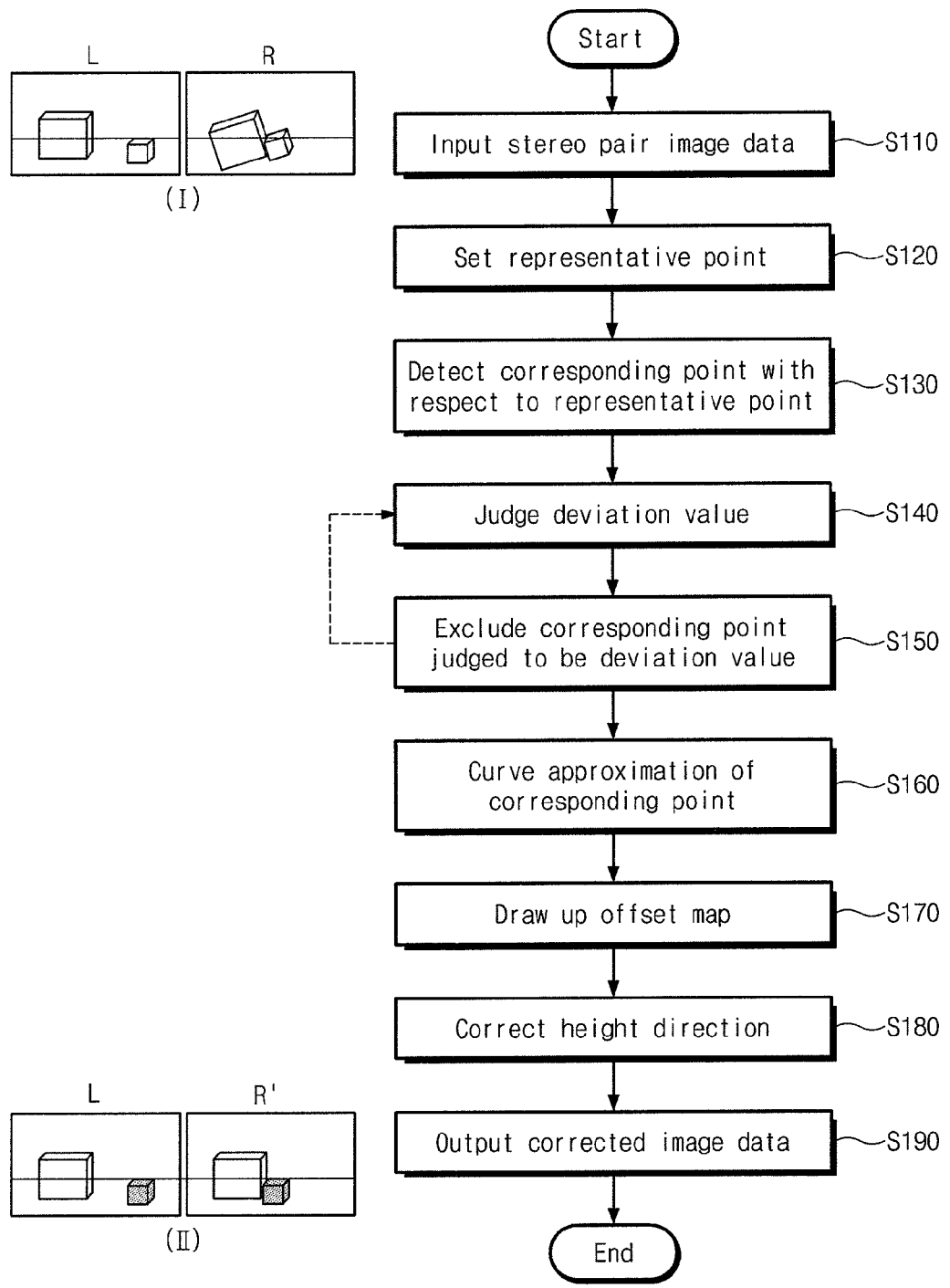
FIG. 10 is a flow chart illustrating a method of processing a stereo image in accordance with some embodiments of the inventive concept.

FIG. 10 is a flow chart illustrating a method of processing a stereo image in accordance with some embodiments of the inventive concept.

Figure 11:
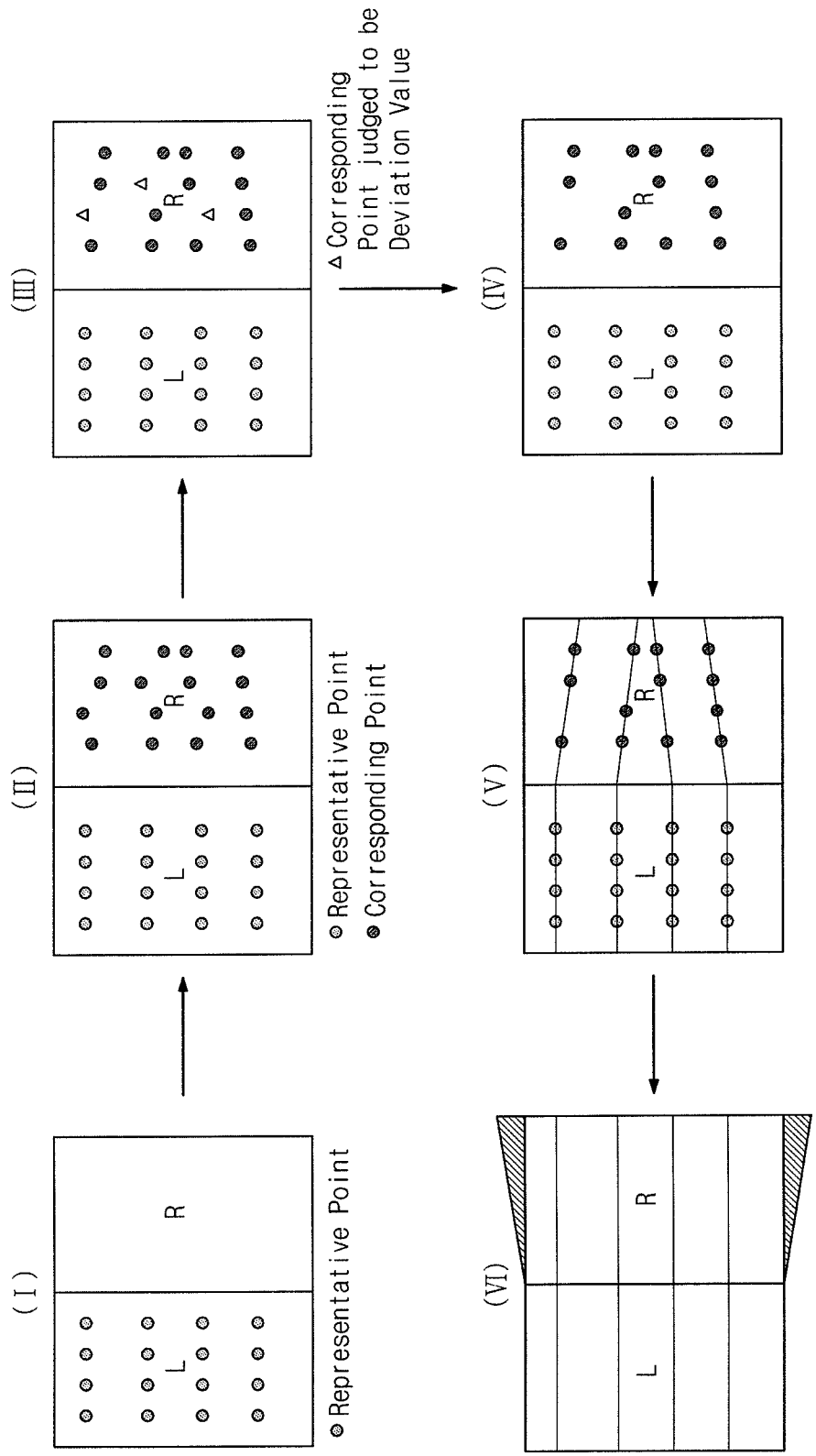
FIG. 11 is a schematic view of a simulated stereo-pair image annotated for illustrating a processing order of steps in the method of processing of FIG. 10.

FIG. 11 is a schematic view of a simulated stereo-pair image annotated for illustrating a processing order steps in the method of processing of FIG. 10.

First, stereo-pair image data is input (step S110). In FIG. 11, a left reference image is called a L image and a right reference image is called a R image. In FIG. 10, a stereo-pair image of (I) is an input stereo-pair image.

A matrix of representative points are set with respect to the L image (step S110). In FIG. 11 (I), each of the representative points is indicated by a grey dot. The representative points, as already described, may be set at graticules in an image and the crossing points of the graticules so that representative pixel points are located at multiple lattice points. The representative points may be set to the desired number. For example, in FIG. 11, sixteen representative points are set at the intersections of 4 vertical lines and ×4 horizontal lines.

The corresponding points corresponding to the representative points of the L image are detected in the R image (step S130) as shown in FIG. 11 (II). Since sixteen representative points are selected, sixteen corresponding points are detected. The block matching method described above may be used to detect each corresponding point.

Whether each of the detected corresponding points is a deviating point or not is judged (step S140) according to a method of judgment. The method of judgment performed may include judging a corresponding point corresponding to a representative point to be a deviating point if the area in which the corresponding point is located has a small image characteristic The method of judgment may further include judging a point having a different trend from surrounding corresponding point to be a deviating point. FIG. 11 (III), illustrates a state that the deviating point have been judged and a each corresponding point judged to be a deviating point is indicated by a triangle.

A corresponding point judged to be a deviating point is excluded (step S150). The step S140 and the step S150 may be repeated with respect to each corresponding point until judging all deviating points is completed. After performing a judgment of deviating point in the step S140 on each corresponding point, a corresponding point judged to be a deviating point may be excluded in the step 150. FIG. 11 (IV), illustrates a state that all corresponding points that were judged to be a deviating point are excluded.

Figure 1:
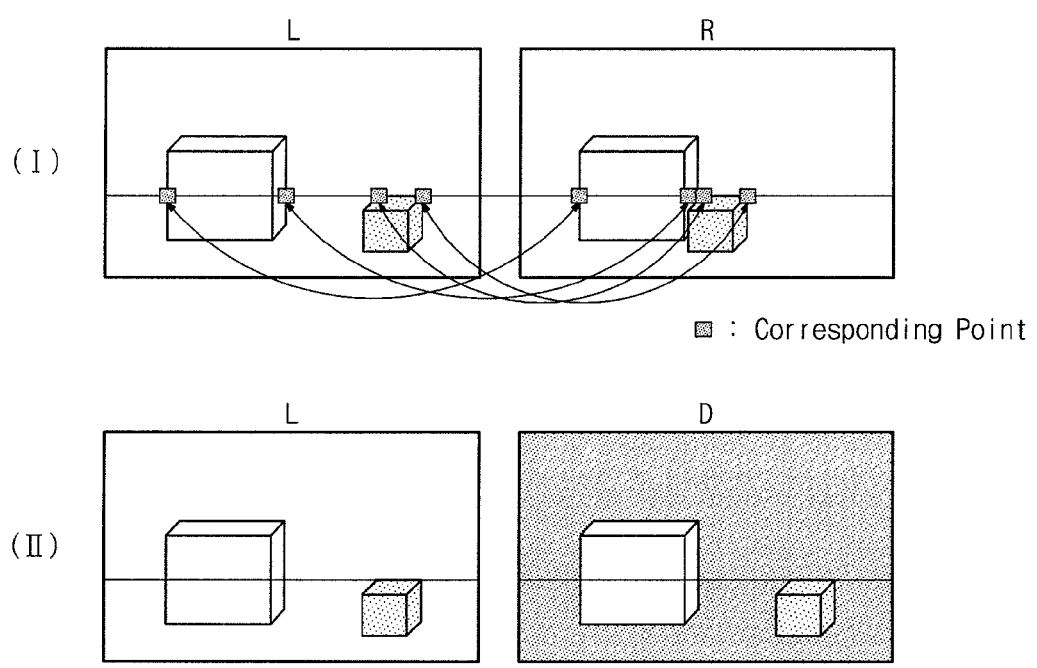
FIG. 1 is a drawing of a simulated stereo-pair image annotated for illustrating a method of extracting depth information from a stereo-pair image by a stereo matching.
Figure 2:
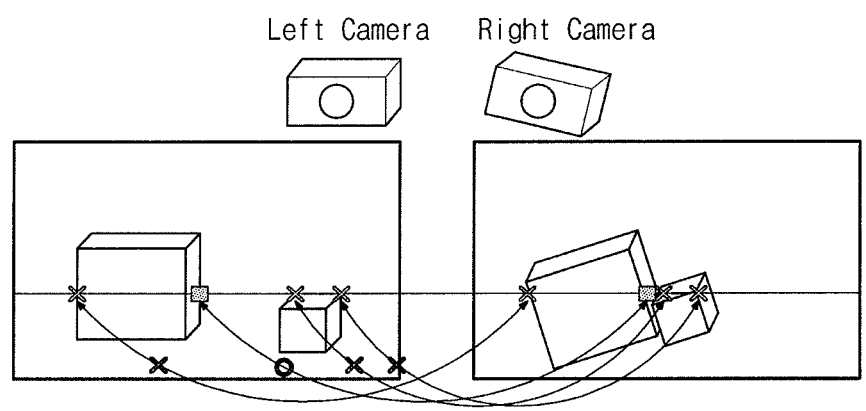
FIG. 2 is a drawing of a simulated stereo-pair image annotated for illustrating an example of when horizontality of a left camera does not coincide with horizontality of a right camera.
Figure 3:
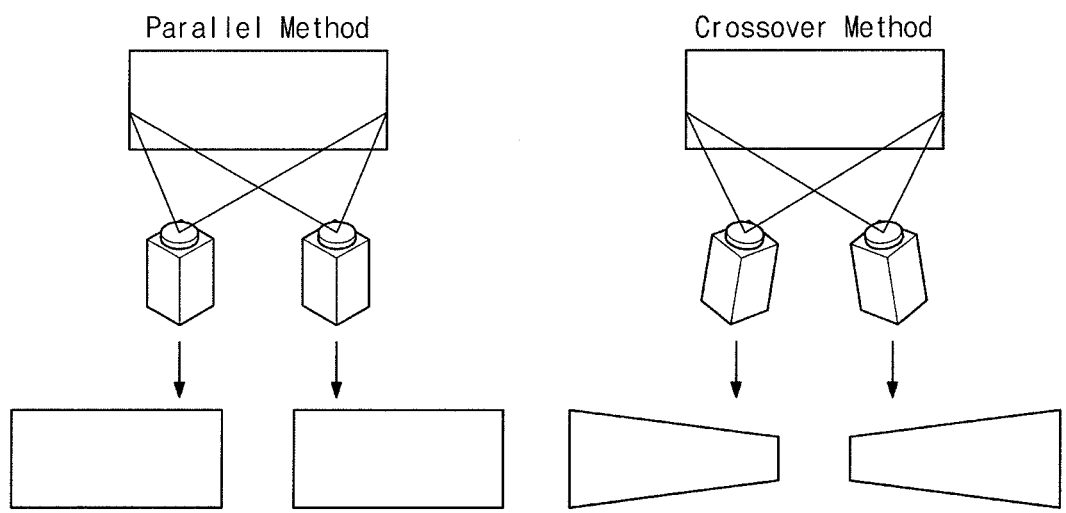
FIG. 3 is a drawing of camera positions and illustrating a trapezoid distortion shape of when using a crossover method.

A curve approximation is performed on all the corresponding points excepting the corresponding point judge to be a deviating point (step S160). In FIG. 11 (V), the curve approximation is represented. As described above, a least square method may be used as the curve approximation method but the curve approximation method is not limited thereto. As illustrated in FIG. 11 (V), at least two of the approximation curves are symmetrical about substantially horizontal line (e.g., running approximately through the "R" in (V)). In some cases there may be different horizontal inclinations of the two cameras, such as a case that a right camera is inclined toward a left camera and horizontality of the left and right cameras does not coincide with each other, as illustrated in FIG. 2. The result illustrated in FIG. 11 (V) may be achieved in such cases by preliminarily rotating the second image based on the vectors of the corresponding points except the excluded deviating points so that at least two of the approximation curves are symmetrical about substantially horizontal line; and then performing parallelization steps as described herein. Conventional image rotation detection methods and conventional image rotation methods (e.g., borrowed from the field of Digital Image Stabilization) may be employed.

A write of curve approximation is applied by a linear polynomial expression, thus, includes a straight-line approximation and a write of approximation curve includes an approximation straight line. As illustrated by (V), a straight-line approximation is conducted and an approximation curve is calculated.

Using an approximation curve calculated by a curve approximation, an offset map representing a correction value of height direction is drawn (step S170). As described above, a difference of height between an approximation curve and a straight line formed by connecting representative points corresponding to a corresponding point used to form the approximation curve is detected. A sequential height correction value is assigned to the approximation curves on the basis of a height correction value of each approximation curve.

With respect to a corresponding image, using an offset map, parallelization is conducted and a height correction is done (step S 180). In FIG. 11, it is represented in (V). In FIG. 10, (II) is a stereo-pair image of after performing a height correction.

A stereo-pair image of after performing a correction is output (step S190) and a process comes to an end. The outputted stereo-pair image of after performing a correction may be used in a stereo matching when performing a subsequent process. Since a height correction is conducted, when extracting depth information in a stereo matching, a big noise does not occur and a 3D image having high quality without a distortion may be represented.

An image processing device in accordance with some embodiments of the inventive concept may be used in a display device.

Figure 12:
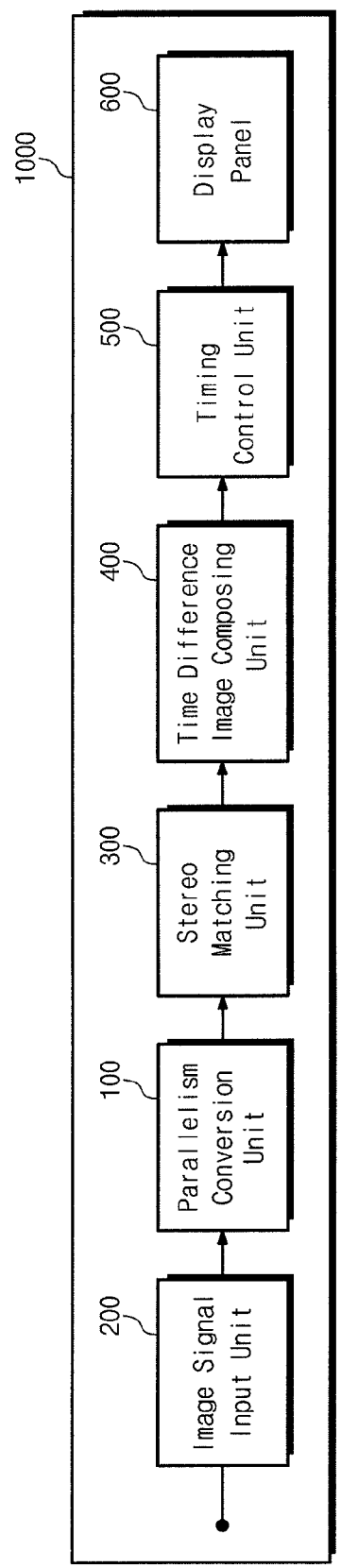
FIG. 12 is a block diagram of a display device in accordance with some embodiments of the inventive concept.

FIG. 12 is a block diagram of a display device in accordance with some embodiments of the inventive concept.

A display device 1000 includes a parallelism conversion unit 100, an image signal input unit 200, a stereo matching unit 300, a time difference image composing unit 400, a timing control unit 500 and a display panel 600. 3D TV or 3D display may be a typical example of the display device 1000.

An image signal is input into the image signal input unit 200 from the outside. When an image signal is input from the outside, the image signal input unit 200 inputs the image signal as image data into the parallelism conversion unit 100.

The parallelism conversion unit 100 is the aforementioned stereo image processing device 100, receives image data, conducts a height correction on a stereo-pair image and outputs a corrected stereo-pair image to the matching unit 300.

The stereo matching unit 300 performs a stereo matching on a corrected stereo-pair image. That is, a corresponding point is obtained from each image taking a picture on a same point and depth information is extracted using its time difference. That is, a first image of the corrected stereo-pair image and data of depth information are converted by the stereo matching unit 300. The firs image and the depth information are transferred from the stereo matching unit 300 to the time difference image composing unit 400.

The time difference image composing unit 400 draws up a time difference image using the first image and the depth information. The thing drawn as the time difference image may be a form according to a wanted three dimensional display method depending on a type of the display device 300 and may be, for example, a time difference image corresponding to a parallax barrier type using a parallax barrier or a time difference image corresponding to a lenticular lens type. In case of drawing up the time difference image, a rendering of multi-viewpoint may be conducted.

The timing control unit 500 generates a signal driving a pixel of upper portion of the display panel 600 of time difference image drawn in the time difference image composing unit 400. The display panel 600 may be, for example, LCD, PDP, etc. and displays a 3D image.

Since in a display device, after taking a picture, a stereo image taken in many film locations and by many imaging systems is used, parallelization of stereo image using an announcement pattern cannot be conducted. Here, it is necessary to conduct a parallelization process in a step of before conducting a stereo matching. According to a display device in accordance with some embodiments of the inventive concept, a parallelization process may be difficult after a conventional taking of pictures. The display device can perform a parallelization process on an image without a distinguishing pattern such as a linear edge, an image in which a scanning line does not coincide with an Epipolar line and a various kinds of stereo-pair images.

What is claimed is:

1. A stereo image processing device comprising:
an image input unit receiving a stereo-pair image;
a representative point selection unit selecting a plurality of representative points in a first image of the stereo-pair image;
a corresponding point control unit detecting in a second image a plurality of corresponding points corresponding to the plurality of representative points of the stereo-pair image;
a deviation value calculation unit judging whether or not each corresponding point is a deviating point;
an exclusion circuit of the corresponding point control unit excluding each corresponding point judged to be a deviating point;
an approximation curve calculation unit performing a curve approximation on all the corresponding points except the excluded deviating points to generate a plurality of approximation curves;
a height correction value calculation unit interpolating a height correction value for each pixel in the second image from the plurality of calculated approximation curves;
a parallelization execution unit performing parallelization of the second image on the basis of the height correction values; and
an image output unit outputting the parallelized second image corresponding to the first image.

2. The stereo image processing device of claim 1, wherein the height correction value calculation unit interpolates the height difference of pixels in a gap between each the approximation curves and a straight line formed by connecting representative points corresponding to the approximation curve as height direction correction values and defines an offset map by assigning the height direction correction value to each pixel of the second image in a gap between the plurality of approximation curves on the basis of the height direction correction value, and wherein the parallelization execution unit performs parallelization of the second image on the basis of the offset map.

3. The stereo image processing device of claim 1, wherein the corresponding point control unit detects the plurality of corresponding points using a block matching method.

4. The stereo image processing device of claim 2, wherein the corresponding point control unit detects the plurality of corresponding points using a block matching method.

5. A method of processing a stereo image comprising:

inputting a stereo-pair image;

selecting a plurality of representative points in a first image of the stereo-pair image;

detecting in a second image of the stereo-pair image the plurality of corresponding points corresponding to the plurality of representative points;

judging whether or not each of the corresponding points is a deviating point and excluding each corresponding point judged to be a deviating point;

performing a curve approximation on the corresponding points except the excluded deviating points to generate a plurality of approximation curves;

interpolating a height correction value for each pixel in the second image from the plurality of approximation curves;

performing parallelization of the second image on the basis of the height correction values; and outputting the parallelized second image.

6. The method of claim 5, wherein interpolating the height correction values comprises calculating a height difference for each pixel between the approximation curves and a straight line formed by connecting representative points corresponding to the approximation curves, making the height difference be a height direction correction value and defining an offset map by assigning the height direction correction value to a gap line between the plurality of approximation curves on the basis of the height direction correction value, and wherein performing parallelization is based on the offset map.

7. The method of claim 6, wherein detecting the corresponding points is performed by a block matching method.

8. The method of claim 5, wherein detecting the corresponding points is performed by a block matching method.

9. The method of claim 5, wherein detecting in a second image the plurality of corresponding points includes calculating a vector for each of the corresponding points; and further comprising:

rotating the second image based on the vectors of the corresponding points except the excluded deviating points so that at least two of the approximation curves are symmetrical about substantially horizontal line; and then interpolating the height correction value for each pixel in the second image from the plurality of approximation curves; and then performing parallelization of the second image on the basis of the height correction values; and then outputting the parallelized second image.

* * * * *